US012806980B2

(12) United States Patent
Schuster et al.

(10) Patent No.: US 12,806,980 B2
(45) Date of Patent: Nov. 24, 2026

(54) VEHICLE ROOF HAVING A FRAME DEVICE

(71) Applicant: Webasto SE, Stockdorf (DE)

(72) Inventors: Samuel Schuster, Stockdorf (DE); Burkhard Reinsch, Stockdorf (DE); Frank Koslowski, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 391 days.

(21) Appl. No.: 18/565,934

(22) PCT Filed: May 27, 2022

(86) PCT No.: PCT/EP2022/064407
§ 371 (c)(1),
(2) Date: Nov. 30, 2023

(87) PCT Pub. No.: WO2022/258397
PCT Pub. Date: Dec. 15, 2022

(65) Prior Publication Data

US 2024/0246399 A1 Jul. 25, 2024

(30) Foreign Application Priority Data

Jun. 7, 2021 (DE) ..................... 10 2021 114 517.1

(51) Int. Cl.
*B60J 7/043* (2006.01)
*B62D 25/07* (2006.01)

(52) U.S. Cl.
CPC .............. *B60J 7/043* (2013.01); *B62D 25/07* (2013.01)

(58) Field of Classification Search
CPC ..... B60J 7/043; B60J 7/02; B60J 7/022; B60J 7/1642; B60J 7/0084; B62D 25/07
(Continued)

(56) References Cited

U.S. PATENT DOCUMENTS 6,065,801 A * 5/2000 Kawamura .............. B60J 7/022 296/213
6,644,728 B1 * 11/2003 Nagashima ............. B60R 13/07 296/213
(Continued)

FOREIGN PATENT DOCUMENTS

DE 19821694 A1 * 11/1999 .............. B60J 7/022
DE 10152951 A1 5/2002
(Continued)

OTHER PUBLICATIONS

Heidan et al. (DE 102017202595 A1) (Year: 2018).*
(Continued)

*Primary Examiner* — Wenwei Zhuo
(74) *Attorney, Agent, or Firm* — Fitch, Even, Tabin & Flannery, LLP

(57) ABSTRACT

A vehicle roof having a frame device of a roof module and having a guide rail attached to the frame device for movable mounting of a vehicle component, in particular of a sunroof cover, wherein the guide rail is arranged on a frame part of the frame device with a seal placed in between, and in that a reference point is provided for positioning the guide rail at a defined installation spacing between the guide rail and the frame part, and the reference point is formed on the frame part, is defined on the frame part or is assigned to the frame part.

13 Claims, 10 Drawing Sheets

(58) Field of Classification Search
USPC ....... 296/121, 107.2, 216.04, 216.07, 216.08
See application file for complete search history.

(56) References Cited

U.S. PATENT DOCUMENTS

| | | | | |
|---|---|---|---|---|
| 2002/0149236 | A1 | 10/2002 | Tolinski | |
| 2003/0047969 | A1* | 3/2003 | Weiss | B60J 7/022 296/216.08 |
| 2018/0162207 | A1 | 6/2018 | Pike | |
| 2019/0299761 | A1* | 10/2019 | Hiramatsu | B60J 7/043 |

FOREIGN PATENT DOCUMENTS

| | | | | |
|---|---|---|---|---|
| DE | 10144738 | A1 | 3/2003 | |
| DE | 102008064548 | A1 | 7/2010 | |
| DE | 102017202595 | A1 * | 8/2018 | B60J 7/022 |
| JP | 5007607 | B2 * | 8/2012 | |
| WO | 2017067667 | A1 | 4/2017 | |

OTHER PUBLICATIONS

Duenzinger (DE 19821694 A1) (Year: 1999).*
JP 5007607 B2 (Year: 2012).*
ISR and Written Opinion issued against corresponding PCT/EP2022/064407; mailed Sep. 6, 2022; In German with English Translation (16 pages).
Office Action issued in parallel Chinese Application: 202280040736.4; date mailed: Mar. 25, 2026; In Chinese with machine English translation (12 pages) References not cited herein from this Office Action have been previously filed and considered.

* cited by examiner

VEHICLE ROOF HAVING A FRAME DEVICE

CROSS-REFERENCE TO RELATED APPLICATIONS

This application is a U.S. national phase application filed under 35 U.S.C. § 371 of International Application No. PCT/EP2022/064407, filed on May 27, 2022, published under WO 2022/258397A1 on Dec. 15, 2022, designating the United States, which claims priority from German Patent Application Number 10 2021 114 517.1, filed on Jun. 7, 2021, which are hereby incorporated herein by reference in their entirety.

FIELD

The invention relates to a vehicle roof having a frame device of a roof module and having a guide rail attached to the frame device for the movable mounting of a vehicle component, in particular a sunroof cover, and to a method for mounting a guide rail on such a frame device.

BACKGROUND

DE 10 2008 064 548 A1 has disclosed a vehicle roof of the type in question having a frame device of a sunroof unit, to the lateral frame longitudinal parts of which guide rails for the mounting of a longitudinally displaceable sunroof cover are attached. If the frame longitudinal parts have supporting ribs for the guide rails, annoying or creaking noises can occur in the event of relative movements between the respective guide rail and the frame longitudinal part.

SUMMARY

The invention is based on the object of providing a vehicle roof of the type mentioned at the beginning having a frame device which is improved with regard to the attaching of the guide rail on the frame device, and of specifying an improved method for mounting such a guide rail.

The object is achieved in the case of the vehicle roof mentioned at the beginning in that the guide rail is arranged on a frame part of the frame device with a seal positioned in between, and in that a reference point is provided for positioning the guide rail with a defined installation distance between the guide rail and the frame part, wherein the reference point is formed on the frame part, defined on the frame part or assigned to the frame part.

The object is further achieved by a respective method having the features of claim 8, having the features of claim 9, having the features of claim 10 and having the features of claim 11.

Advantageous refinements of the invention are specified in the dependent claims.

In the case of the frame device according to the invention, the guide rail is thus arranged on the frame part with a seal positioned in between. This prevents direct contact between the guide rail and the frame part and, in particular, between a guide rail base and the frame part or a frame base of the frame part. In order to maintain a defined installation distance between the guide rail or the guide rail base and the frame part or the frame base, support parts, support ribs or other contact parts on the frame part are not required. Such support parts and the like, via which otherwise a defined installation distance between the guide rail or the guide rail base and the frame part can be set by direct support contact, may cause annoying noises when the guide rail moves relative to such support parts and rubs against them. By contrast, in the case of the frame device according to the invention, the correct defined installation distance or such a gap between the guide rail or the guide rail base and the frame part or the frame base is set via the position of the guide rail relative to the reference point. This means that the guide rail is free of contact with the frame part or the frame base.

The reference point can be formed by one or else more points and also by a surface. If the reference point is formed on the frame part, a shaping of the frame part or a part attached to the frame part, for example, is provided for the reference point. If the reference point is defined on the frame part, the reference point may be located, for example, on a region of the frame part in which the frame part is formed without a special design for the frame part. A reference point assigned to the frame part may be located, for example, on a part outside the frame part, for example, on a mounting support or on an auxiliary part or a support part, which is preferably used when mounting the guide rail onto the frame part.

In the case of the frame device according to the invention, in particular two such guide rails are provided, which connect a front frame transverse part and a rear frame transverse part to each other. The front frame transverse part and the rear frame transverse part each have, at their lateral ends, a frame part to which each guide rail is fastened to its front end and also at its rear end, with the seal positioned in between. The frame part can be part of the front frame transverse part and also of the rear frame transverse part or it is connected thereto as a separate part.

The frame device is preferably arranged or integrated on a roof module, which, for example, constitutes a sunroof constructional unit and is attached to the vehicle roof.

Expediently, it is provided, in one embodiment, that the guide rail has a guide rail base with an opening arranged therein. On the frame part or on the frame base is arranged or formed a spacer which protrudes from the frame part or from the frame base into the opening in the guide rail base and in particular without contact with the guide rail base. The spacer contains the reference point. In principle, the spacer is intended to be arranged without contact with the guide rail or with the guide rail base. However, a certain contact between the spacer and the guide rail or the guide rail base may also be permitted, e.g. as an installation aid when positioning the guide rail.

According to a preferred embodiment, it is provided that the spacer has a spacer head containing the reference point. The spacer or the spacer head is arranged with the reference point level with a top side of the guide rail base surrounding the opening. The level arrangement constitutes an easily recognizable confirmation of the correct installation position of the guide rail. The level arrangement can, for example, be detected optically or can also be sensed mechanically.

Preferably, the spacer is formed in a web- or rib-like manner. However, the spacer may also be cylindrical or pin-shaped, for example. Expediently, the guide rail base is formed flat on its top side surrounding the opening. The flat top side may also be formed with depressions or interruptions.

According to a further preferred embodiment, it is provided that a mounting tool, in particular a mounting ram, by means of an engagement surface or an engagement region, is simultaneously in mounting engagement on the top side of the guide rail base and on the spacer or its spacer head. With this simultaneous dual system, the mounting tool or the mounting ram has then positioned the guide rail at the intended distance from the frame part. This mechanical contact is a particularly simple way of detecting the reference point.

According to a second preferred embodiment, it is provided that the guide rail has a guide rail base with an opening arranged therein, and in that on the frame part a frame part region arranged under the opening in the guide rail base defines or contains the reference point. The frame part region has, for example, a flat top side, in particular without elevations or the like.

In this embodiment, it is expediently provided that a mounting tool, in particular a mounting ram, by means of an engagement surface or an engagement region, is in mounting engagement on the top side of the guide rail base and with the frame part region of the frame part containing the reference point, by means of a tool spacer protruding from the engagement surface or the engagement region, by reaching through the opening. The mounting tool pushes the guide rail base against the frame part which is supported on a mounting support.

According to a third preferred embodiment, it is provided that the frame part has a bottom opening, and that the guide rail has a guide rail base on which a projection or a spacer, which protrudes downward against or into the bottom opening in the frame part, is arranged or formed. The reference point is assigned to the bottom opening in the frame part. The reference point is located, for example, on a mounting support. The one projection or the spacer protrudes against or into the bottom opening in particular without contact with the frame part.

In this embodiment, it is expediently provided that a mounting tool, in particular a mounting ram, by means of an engagement surface or an engagement region is in mounting engagement on the top side of the guide rail base, and that the projection of the guide rail base or a spacer forming the latter is supported on a mounting support part, which supports the frame part on the underside and contains the reference point.

According to a fourth preferred embodiment, it is provided that the frame part has a bottom opening, that the reference point is assigned to the bottom opening in the frame part, and that the guide rail has a guide rail base via which it is arranged at a defined installation distance from the frame part. The reference point is provided, for example, on a mounting support part protruding into the bottom opening and as far as the guide rail base. The guide rail preferably contains a flat guide rail base without a projection or the like.

In this embodiment, it is expediently provided that a mounting tool, in particular a mounting ram, by means of an engagement surface or an engagement region, is in mounting engagement on the top side of the guide rail base. A mounting support part containing the reference point supports the frame part on the underside, while it reaches through the bottom opening in the frame part and protrudes against the guide rail base. The guide rail lies in its installation position with its guide rail base against the reference point or against the mounting support part.

Preferably, the seal crosses under the guide rail next to the opening and adjacent thereto. The seal is a spacer and therefore the guide rail is not in direct and in particular planar contact with the frame part. The position of the seal in the gap between the guide rail and the frame part is predetermined in particular in that the seal expediently separates a dry region of the frame device from a wet region of the frame device. The seal is therefore arranged next to the opening and adjacent thereto in such a way that water, which collects on the guide rail and can drip down through the opening surrounding the spacer to the frame part, enters the wet region of the frame device. The water can drain out of the wet region in the usual way via a drain. Expediently, such a wet region, via which water which has flowed thereto from the respective guide rail is discharged, is arranged at each corner region of the frame device.

Expediently, the frame part contains a preset position for the arrangement of the seal. This makes it easier to manually attach the seal at the correct position. For example, the preset position can be a marker that constitutes an optical positioning aid.

The frame part may also have a depression or a sealing channel at which the seal is arranged. The depression or the sealing channel are formations for receiving the seal, which may also limit the expansion of the seal during its compression when the guide rail is pressed against the frame part. Such depressions can also be referred to as haptic preset positions.

Preferably, the seal contains an in particular strand-like sealing compound or a sealing cord. The seal is produced in particular from butyl rubber, but may also be produced from other sealing materials.

In a method according to the invention for mounting a guide rail on such a frame device, it is provided that the seal is applied to the frame part. In principle, however, it is also possible to attach the seal to the side of the guide rail facing the frame part. In addition, the guide rail is positioned above the frame part and with its opening above the spacer. Furthermore, a mounting tool contacts the top side of the guide rail in the region of the opening. The mounting tool then moves the guide rail against the frame part in an infeed movement, compressing the seal. The infeed movement of the mounting tool is ended when the mounting tool has reached a defined position relative to the reference point or to the spacer. At this defined position of the mounting tool, the guide rail has taken up its intended installation position. In particular, the guide rail base is at a defined installation distance from a frame base of the frame part, on which the spacer is expediently arranged.

Preferably, in this method, the infeed movement of the mounting tool is ended when the mounting tool contacts the spacer or the spacer head. This mechanical contact provides a simple and robust detection of the reference point.

In a further method for mounting a guide rail on such a frame device of a roof module of a vehicle roof, which is formed as claimed in either of claims 1 and 4, it is provided according to the invention that the seal is applied to the frame part, that the guide rail is positioned above the frame part and with its opening above the reference point, that a mounting tool contacts the top side of the guide rail in the region of the opening, that the mounting tool moves the guide rail against the frame part in an infeed movement, compressing the seal, and that the infeed movement of the mounting tool is ended when the mounting tool, by means of a projection or tool spacer that engages in the opening or passes through the opening; has reached a defined position relative to the reference point on the frame part or in contact with the reference point, in which the guide rail has taken up its intended installation position.

In a further method for mounting a guide rail on such a frame device of a roof module of a vehicle roof, which is formed as claimed in either of claims 1 and 5, it is provided according to the invention that the seal is applied to the frame part, that the guide rail is positioned above the frame part and with its projection above the bottom opening in the frame part, that a mounting tool contacts the top side of the guide rail in the region opposite its projection, that the mounting tool moves the guide rail against the frame part in an infeed movement, compressing the seal, and that the infeed movement of the mounting tool is ended when the mounting tool has shifted the guide rail, by its projection passing through the bottom opening; into a defined position relative to the reference point, in which the guide rail has taken up its intended installation position.

In a further method for mounting a guide rail on such a frame device of a roof module of a vehicle roof, which is formed as claimed in either of claims 1 and 6, it is provided according to the invention that the seal is applied to the frame part, that the guide rail is positioned above the frame part and above the bottom opening in the frame part, that a mounting tool contacts the top side of the guide rail in the region above the bottom opening in the frame part, that the mounting tool moves the guide rail against the frame part in an infeed movement, compressing the seal, and lies against a mounting support part containing the reference point, which supports the frame part on the underside and passes through the bottom opening in the frame part.

BRIEF DESCRIPTIONS OF THE DRAWINGS

In the following, a vehicle roof according to the invention having a frame device is explained in more detail using exemplary embodiments with reference to the drawing, in which.

DETAILED DESCRIPTION

Figure 1:
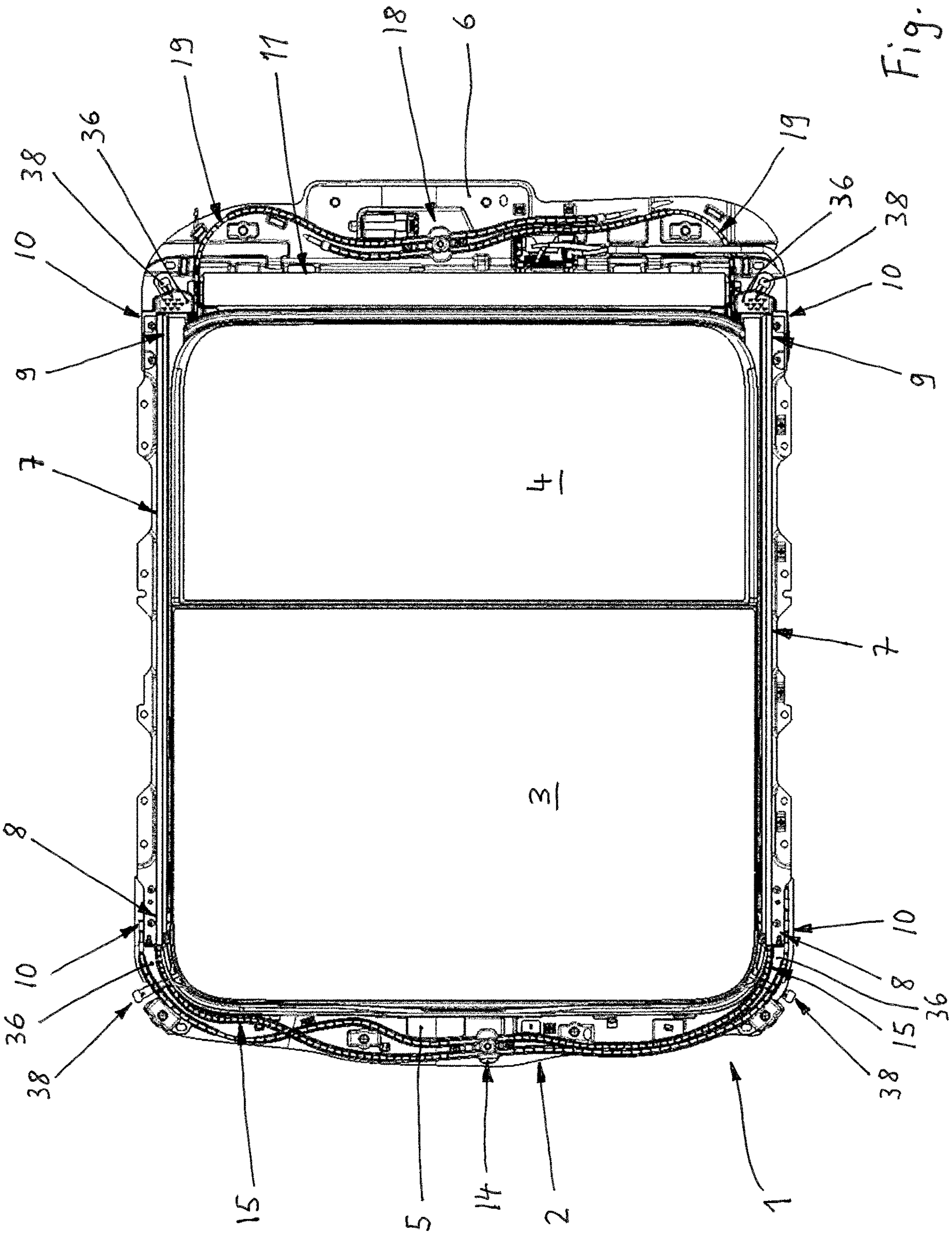
FIG. 1 shows, in a top view, a frame device according to the invention having two lateral guide rails.
Figure 2:
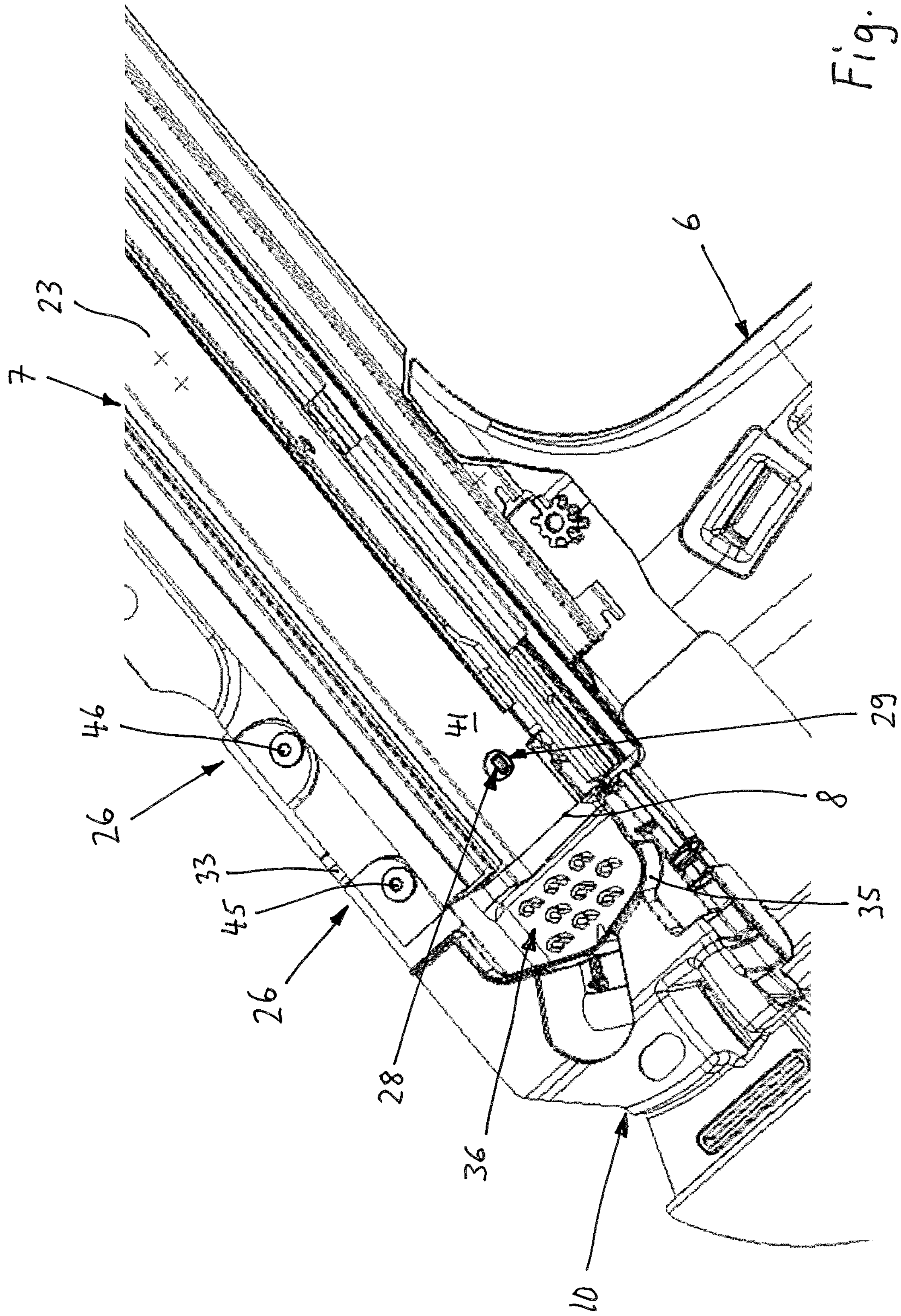
FIG. 2 shows, in an isometric view, a rear corner region of the frame device of FIG. 1 with the guide rail and a spacer in an opening in the vicinity of the rear end of the guide rail.

A roof module 1, which comprises a sunroof unit, of a vehicle roof of a passenger car has a frame device 2 (FIG. 1) on which a front glass sunroof cover or cover 3 is movably mounted and a rear, in particular transparent, cover 4 is fixedly attached. The frame device 2 forms a constructional unit which can be fixed to a structure of the vehicle roof surrounding a roof opening, in particular on the underside of the vehicle roof ("bottom load"). The frame device 2 contains a front frame transverse part 5 and a rear frame transverse part 6. The respective lateral longitudinal connection of the front frame transverse part 5 to the rear frame transverse part 6 is carried out by means of a guide rail 7. The guide rail 7 is fastened in the region of its front end 8 and in the region of its rear end 9 to a respective frame part 10. A respective lateral end portion of the front frame transverse part 5 and also of the rear frame transverse part 6 constitutes such a frame part 10.

The frame device 2 may also have a separate frame longitudinal part (not shown) for each lateral longitudinal connection, to which the guide rail 7 is attached. The frame part 10 provided for fastening the guide rail 7 is in this case, for example, a front or rear portion of the respective frame longitudinal part.

On the rear frame transverse part 6 of the frame device 2, a winding shaft of a roller blind device 11 is rotatably mounted, the roller blind web of which can be retracted and extended under the covers 3 and 4.

Figure 5:
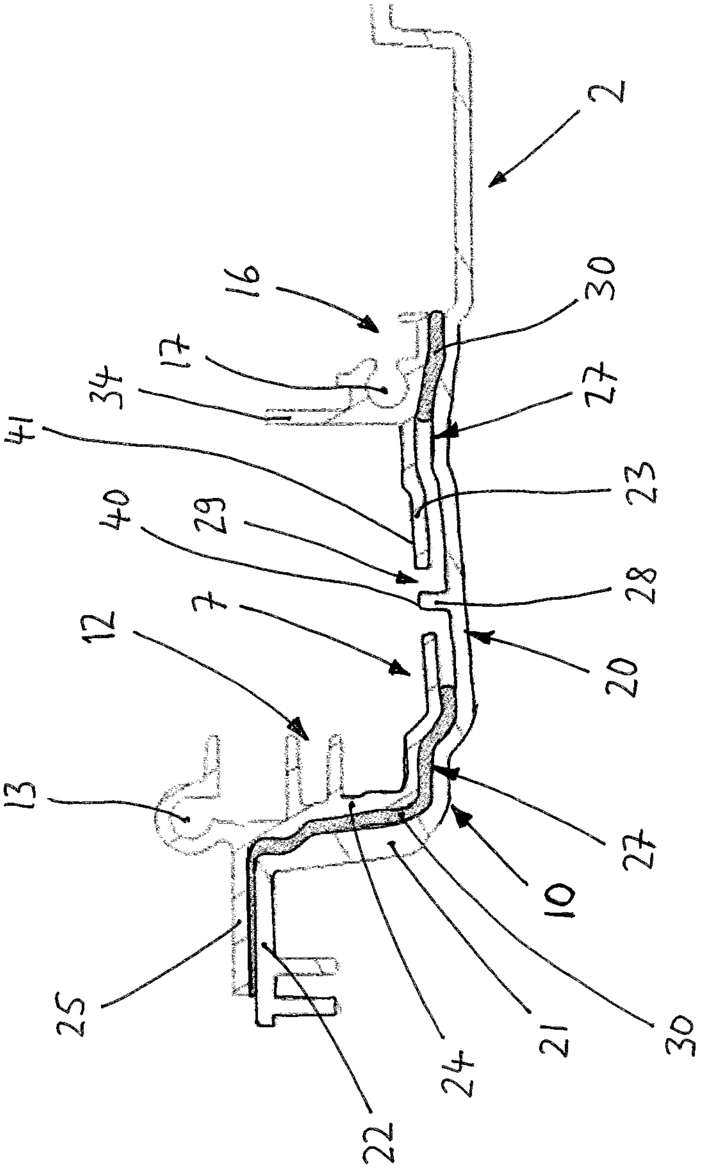
FIG. 5 shows, in a vertical cross-sectional view along the sectional line A-A in FIG. 4, the guide rail arranged on a frame part of the frame device.
Figure 6:
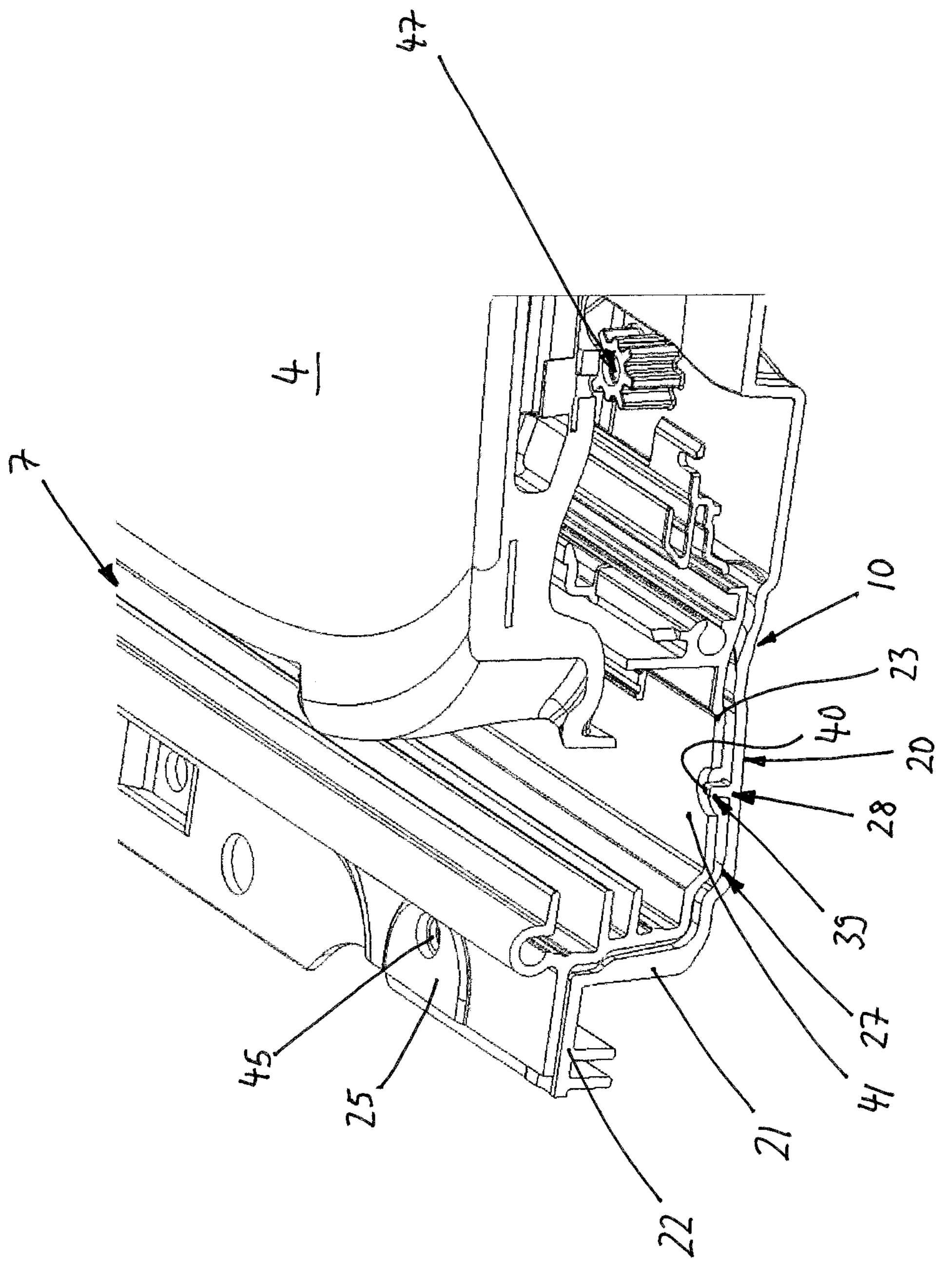
FIG. 6 shows, in an isometric view, the frame part sectioned at the sectional line A-A of FIG. 4 with the guide rail.

The respective guide rail 7 contains guides 12 (FIG. 5) for a drive and bearing device of the cover 3, for example for sliders (not shown) of the drive and bearing device, and a cable guide channel 13 of a drive cable which is connected to the drive and bearing device. On the front frame transverse part 5, there is arranged a drive motor 14 of known design, from which in each case one of the two drive cables is guided via an assigned cable guide 15 to the front end 8 of the left or the right guide rail 7. Each guide rail 7 furthermore contains guides 16 for a drive and bearing device of the roller blind device 11, such as, for example, for lateral sliders of a tension bow of the roller blind web, and a cable guide channel 17 of a drive cable, which is connected to the drive and bearing device. On the rear frame transverse part 6, there is arranged a drive motor 18 of known design, from which in each case one of the two drive cables is guided via an assigned cable guide 19 to the rear end 9 of the left or the right guide rail 7.

The guide rail 7 is fastened in the region of its front end 8 and also in the region of its rear end 9, in particular by means of screw connections, to the frame part 10, the fastening of the guide rail 7 in the region of its rear end 9 being explained below.

The frame part 10 (see FIGS. 2 to 7) contains a frame base 20, a frame side wall 21 and a frame flange 22. The guide rail 7 has a guide rail base 23, a guide rail side wall 24 and a guide rail flange 25. The frame part 10 is adapted in its design to the guide rail 7 at least in that region of the fastening or in the fastening region 26, in which the guide rail 7 is attached to the frame part 10, in such a way that a narrow gap 27 is formed between the frame part 10 and the guide rail 7.

The frame part 10 has a spacer 28 which protrudes upward from the frame base and engages in an opening 29 formed in the guide rail base 23. The opening 29 is preferably located approximately centrally in an in particular flat central region of the guide rail base 23. The spacer 28 is, for example, in the shape of a round pin or an elongate rib and is arranged in association with the opening 29 on the frame base 20. The opening 29 is expediently round, but may also be, for example, elongate. Preferably, the opening 29 has such a diameter or such a size that the spacer 28 arranged therein is not in contact with the guide rail base 23.

A seal 30 is arranged between the frame part 10 and the guide rail 7. The seal 30 extends in the fastening region 26 of the guide rail 7 substantially transversely with respect to the longitudinal extent of the guide rail 7. The seal 30 is formed, for example, from a strand-like sealing compound or from a sealing cord and is preferably formed from butyl rubber.

Figure 3:
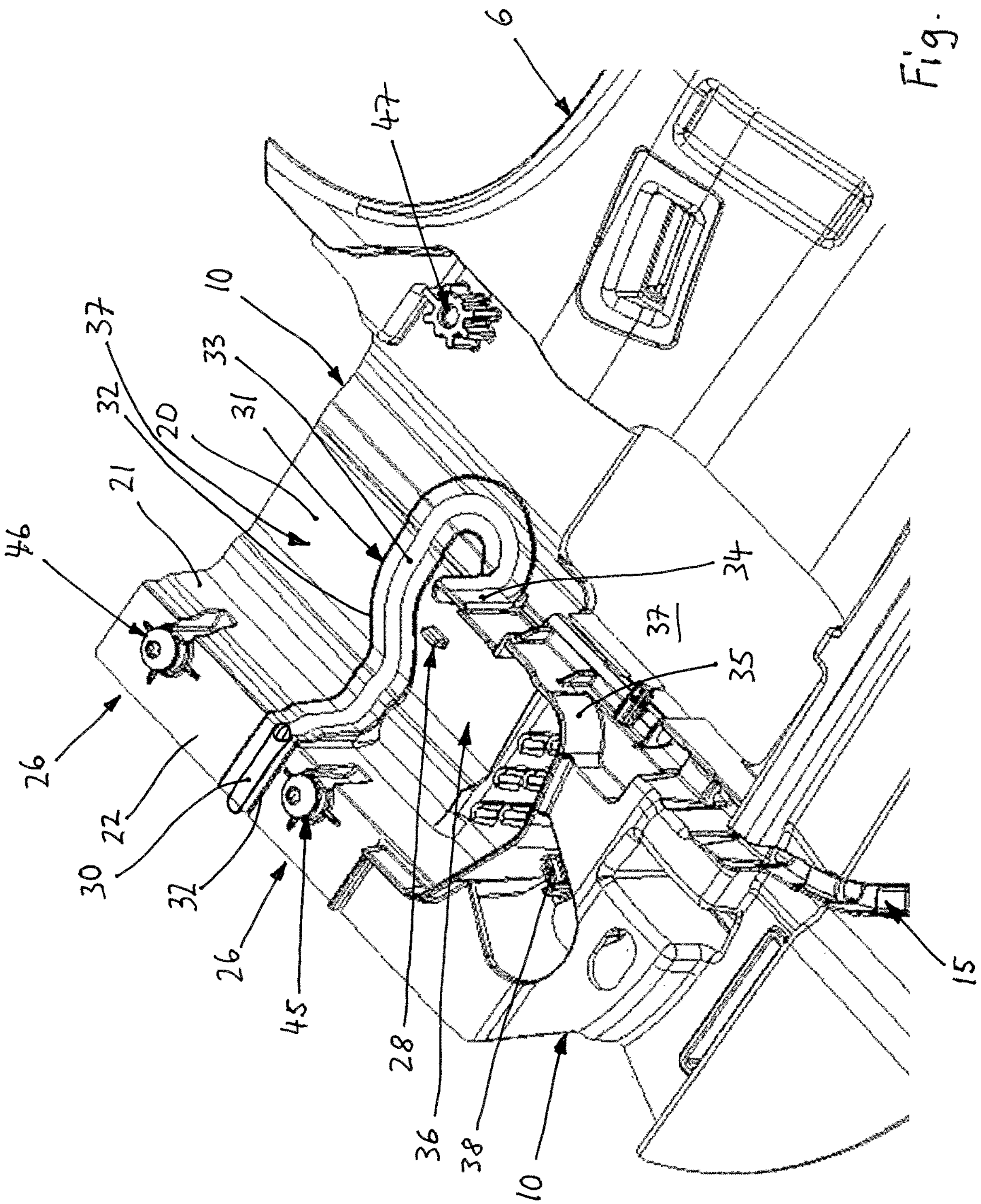
FIG. 3 shows, in an isometric view, the rear corner region, shown in FIG. 2, of the frame device before the mounting of the guide rail.
Figure 4:
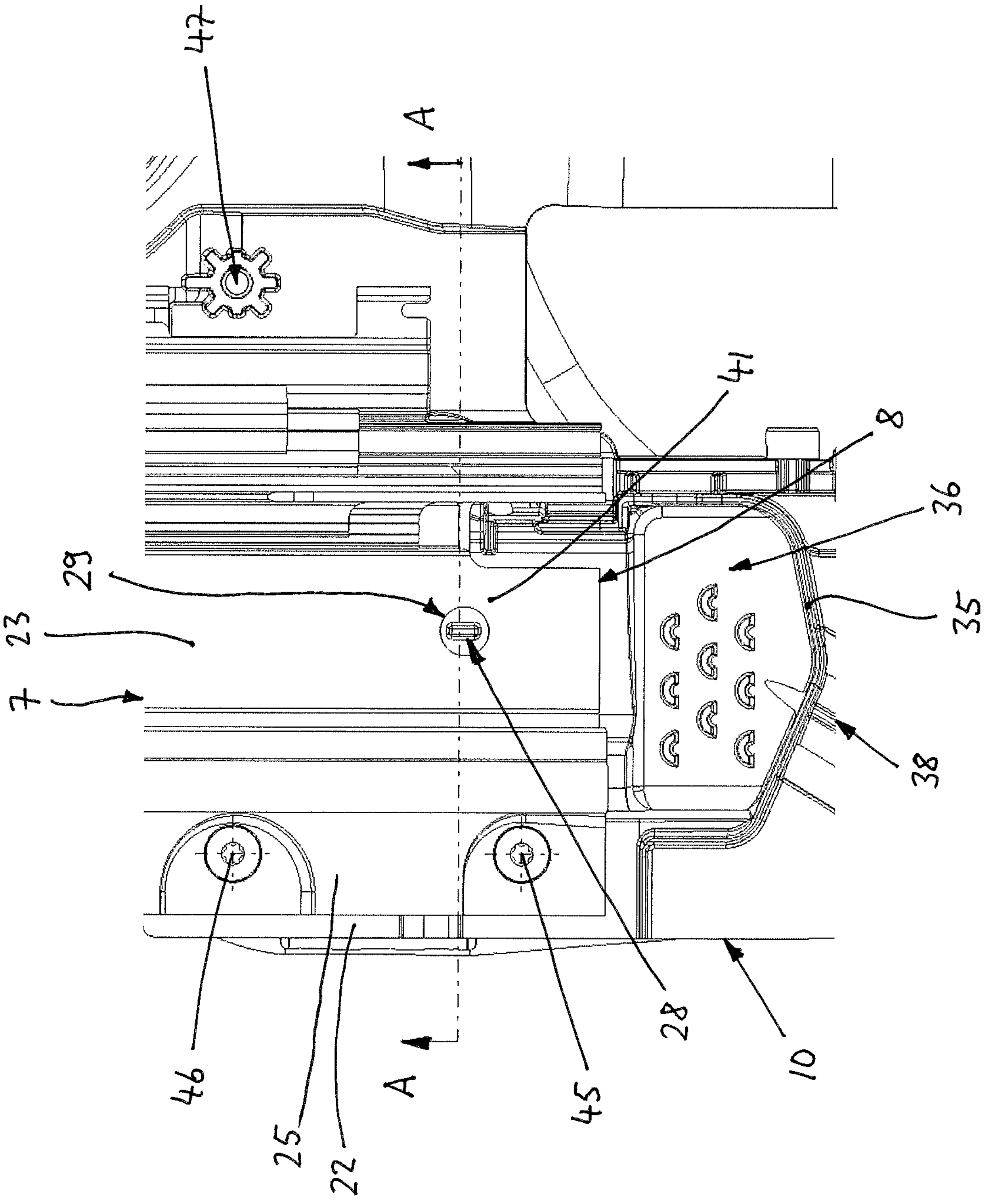
FIG. 4 shows, in a top view, the rear corner region, shown in FIG. 2, of the frame device with the spacer in the opening in the guide rail.

The frame part 10 expediently has a preset position 31 (see FIG. 3) for the seal 30. The preset position 31 marks the course of the in particular strip-shaped region on the frame part 10, which is provided for correct attachment of the seal 30. The preset position 31 can be a marking 32, which contains, for example, a center line or two adjacent boundary lines, which is/are applied to or are formed on the frame part 10. The preset position 31 is in particular an elongate depression 33, which is formed on the frame part 10, for example, in the form of a sealing channel (FIG. 3 shows only a portion of the seal 30 arranged on the frame flange 22).

The seal 30 is positioned on the frame part 10 before attaching or mounting the guide rail 7 to or on the frame part 10. The seal 30 runs on the frame flange 22 in a position relative to the longitudinal direction of the frame device 2 approximately level with the spacer 28 inward to the frame side wall 21 and on the frame side wall 21 downward to the frame base 20. The seal 30 crosses the frame base 20, wherein it is arranged in an arcuate manner around the spacer 28 and is guided in the longitudinal direction in front of and past the spacer 28. From the frame base 20, the seal 30 runs upward on an upright wall portion 34. The wall portion 34 is a part of a boundary wall 35, which limits a rear wet region 36 of the frame device 2 on the rear frame transverse part 6. When the guide rail 7 is attached to the frame part 10, the wet region 36 is delimited by means of the seal 30 toward a dry region 37 of the frame device 2. The dry region 37 is located on the frame part 10 under the guide rail 7 and in an inwardly adjacent region. Water which reaches past the lateral edges of the covers 3 and 4 onto the guide rail 7 can flow forward and rearward on the guide rail 7, which is approximately channel-shaped or trough-shaped in cross section, for example. Such water can drip into the wet region 36 via the rear end 9 of the guide rail 7, which ends above the wet region 36, and can drain from there via a drain channel 38. Wet regions 36 with drain channels 38 are provided at the four corner regions of the frame device 2 (see FIG. 1).

The spacer 28 has a spacer head 39 which forms or contains a reference point 40. The reference point 40 is located at the highest point of the spacer head 39, which is at the greatest distance perpendicular to the frame base 20, in particular in the case of a convexly curved shape of the spacer head 39. When the spacer head 39 is formed with a flat top side, said top side or surface forms a reference region or a reference surface containing the reference point 40.

When attaching the guide rail 7 to the frame part 10, the guide rail 7 is guided in such a position against the frame part 10 that the opening 29 moves substantially centrally with respect to the spacer 28. The guide rail 7 compresses the seal 30 lying in between as it approaches the frame part 10. The guide rail 7 is moved toward the frame part 10 until it has reached its installation position, with the gap 27 being formed at the intended height. In the installation position of the guide rail 7, a top side 41 of the guide rail base 23 which surrounds the opening 29 and is in particular formed flat is arranged level with the reference point 40 of the spacer head 39. The positioning of the guide rail 7 in this installation position is preferably carried out by means of a mounting tool 42, which in particular has a mounting ram 43, which has an engagement surface 44, which rests flat on the top side 41 of the guide rail base 23 and presses the guide rail 7 against the frame part 10, until its engagement surface 44 lies against the spacer head 39. The spacer head 39 thus forms a stop, which ends and prevents a further infeed movement of the mounting tool 42. The guide rail base 23 or its top side 41 may also be inclined, wherein then a flat top side or surface of the spacer head 39 is adapted in its inclination thereto.

The guide rail 7 is fastened at three fastening points 45, 46 and 47 (FIG. 3) to the frame part 10, for example, by means of screw connections, wherein the seal 30 and in particular respective damping elements prevent contact between the guide rail 7 and the frame part 10 that could generate creaking noises due to undesirable friction during relative movements between the guide rail 7 and the frame part 10.

The guide rail 7 thus rests on the frame part 10 only via the seal 30 positioned in between. Direct resting of the guide rail 7 or its guide rail base 23 on the frame part 10 or on the frame base 20 or on support parts of the frame part 10 or of the frame base 20, which are intended to ensure a certain distance of the mounted guide rail 7 from the frame part 10 or from the frame base 20, is therefore not required and can also be avoided. Accordingly, by means of the attachment according to the invention of the guide rail 7 to the frame part 10, it is possible to avoid even creaking noises or annoying noises.

The spacer 28 is a part integrally formed on the frame base 20. The frame base or the frame part 10 alone or in connection with the front or rear frame transverse part 5 or 6 is, for example, an injection molded part made of plastic or metal or it is produced from a composite material. The spacer 28 may also be a part attached to the frame base 20. In any case, the spacer 28 is so deformation-resistant that it is not deformable by the pressure of the mounting tool 42.

In a modified second embodiment shown in FIG. 8, a frame part region 48 of the frame base 20, located below the opening 29 in the guide rail base 23, is formed, for example, with a flat top side. A raised spacer 28, as the embodiment shown in FIG. 7 has, is not provided. The reference point 40 is located on the frame part region 48 below the opening 29 and is expediently defined as a point or a small surface, for example having a size corresponding to the size of the opening 29, on the top side of the frame base 20.

The mounting ram 43 of the mounting tool 42 has a tool spacer 49 which protrudes downward from the engagement surface 44 of the mounting ram 43. The diameter of the tool spacer 49 or its cross section is smaller than the diameter or the cross section of the opening 29. The protrusion of the tool spacer 49 beyond the engagement surface 44 and thus the length of the tool spacer 49 is dimensioned such that the mounting ram 43, when it lies in its end position with an end face 50 of the tool spacer 49 against the frame base 20 at the reference point 40 of the frame part region 48, has set the guide rail base 23 at the defined distance from the frame base 20 by means of its engagement surface 44, which rests on the top side 41 of the guide rail base 23. The tool spacer 49 thus forms a stop that ends and prevents a further infeed movement of the mounting tool 42.

Figure 7:
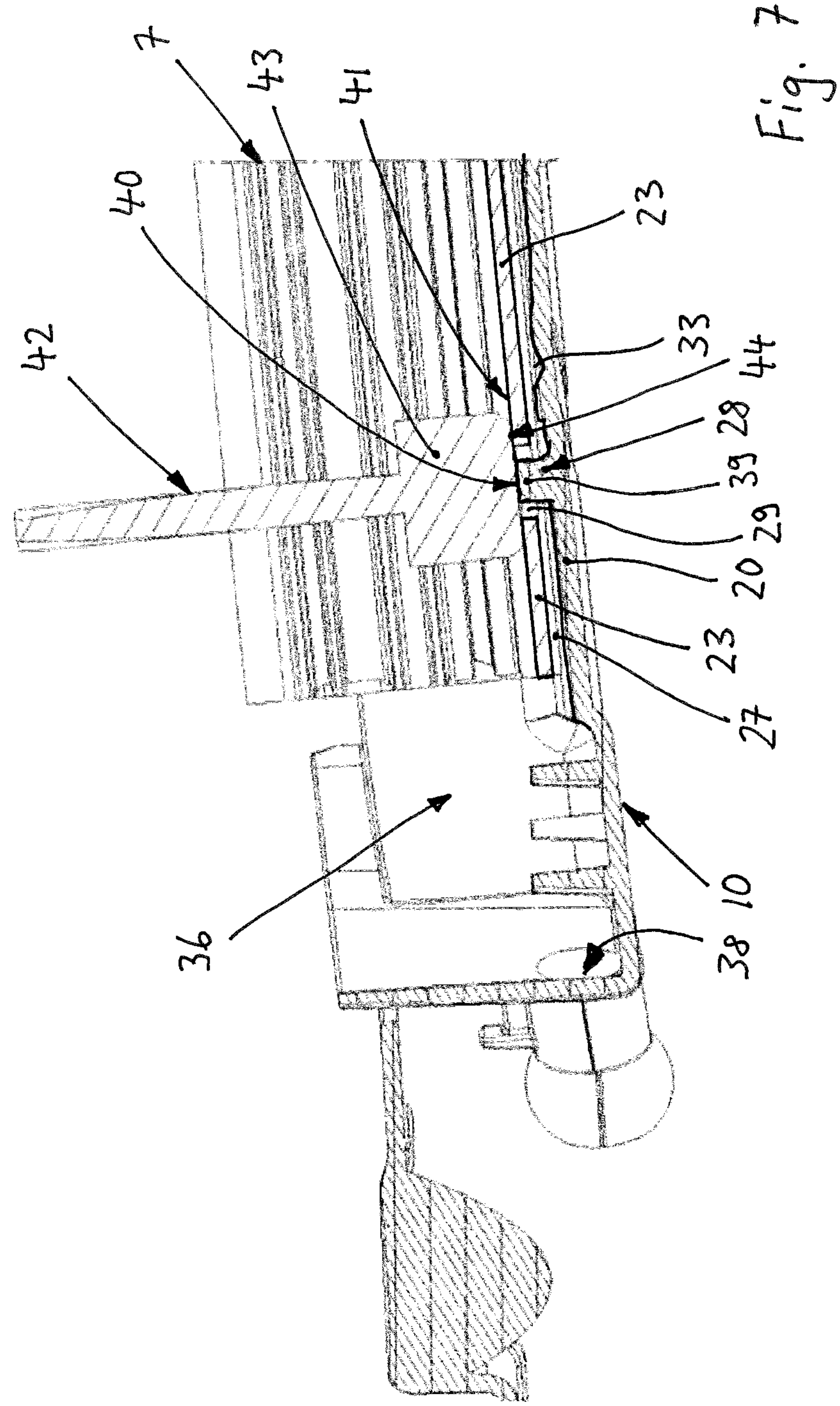
FIG. 7 shows, in a vertical longitudinal sectional view, the frame part with a tool ram, which holds the guide rail positioned in the installation position in contact with the spacer.
Figure 8:
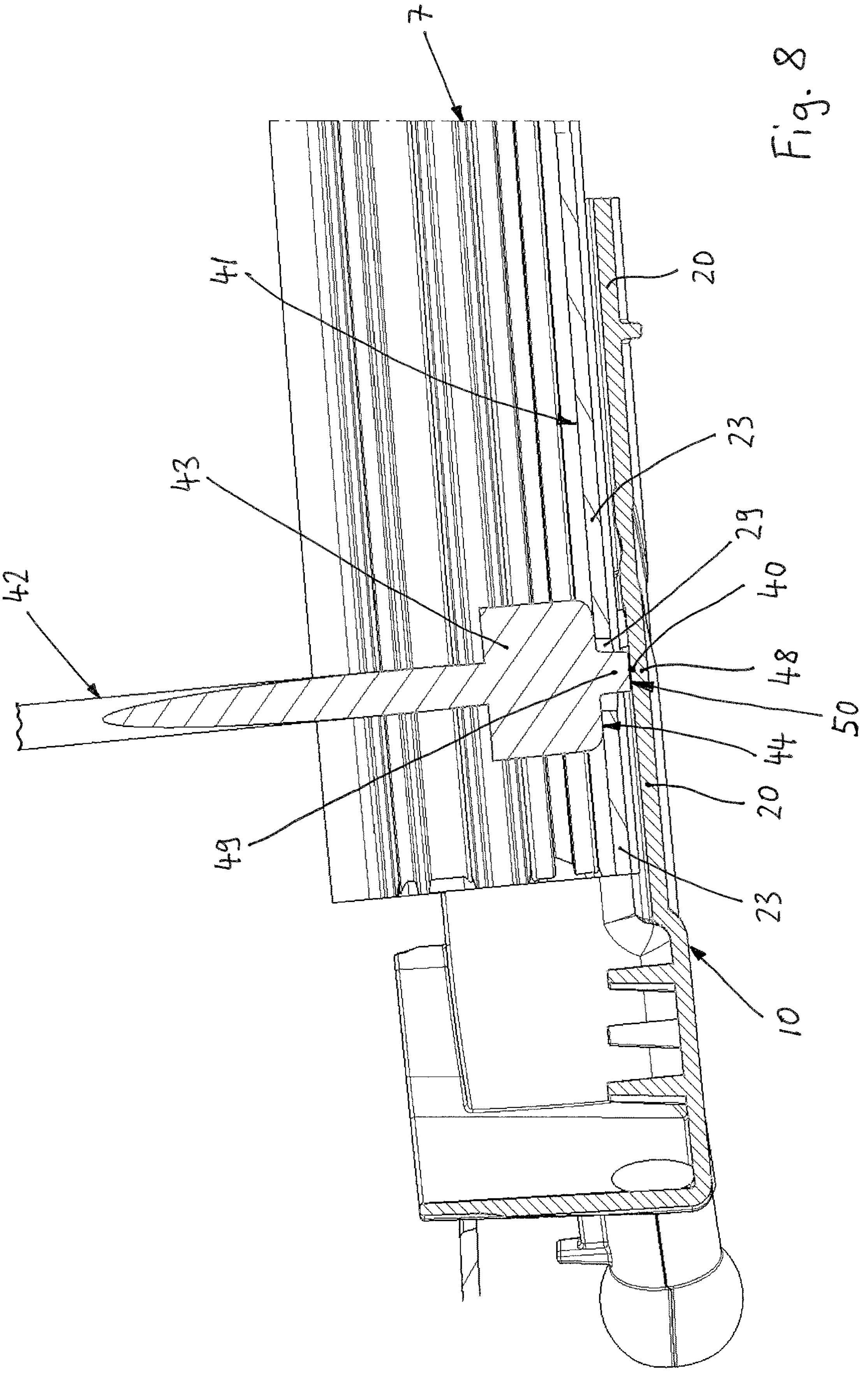
FIG. 8 shows, in a vertical longitudinal sectional view, another embodiment in which the tool ram is in engagement on the guide rail and on the frame part.

According to an optional modification of the two preceding embodiments of FIGS. 7 and 8, both a spacer 28 on the frame base 20, which is reduced in its length compared to the embodiment of FIG. 7, and a tool spacer 49 on the mounting ram 43 that is reduced in its length compared to the embodiment of FIG. 8, are provided. The overall length of the spacer 28 and of the tool spacer 49 corresponds to the length of the sole spacer 28 of FIG. 7 or the sole tool spacer 49 of FIG. 8. During the mounting process, the tool spacer 49, depending on its length, engages in or passes through the opening 29 and lies against the reference point of the spacer 28.

Figure 9:
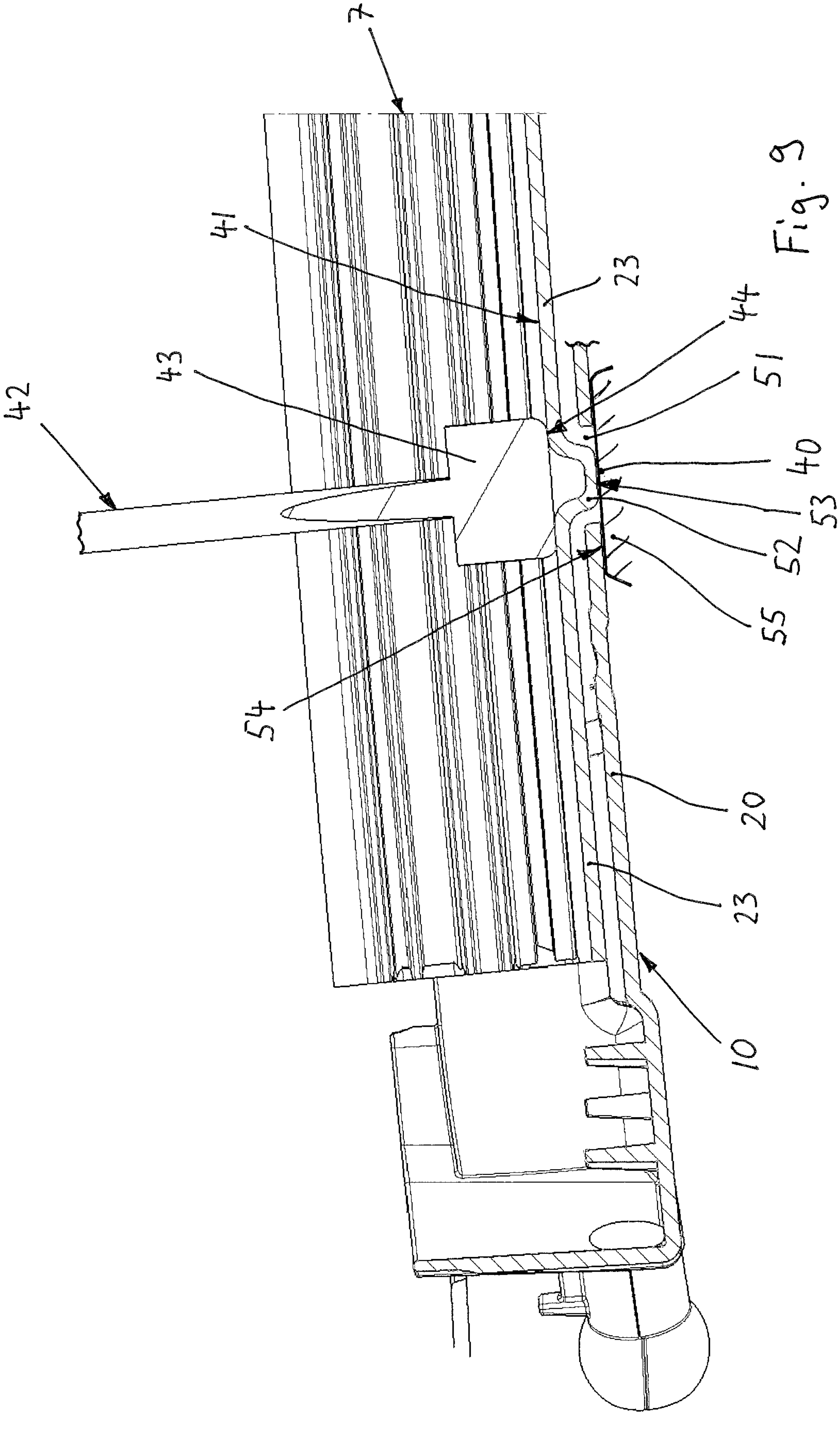
FIG. 9 shows, in a vertical longitudinal sectional view, another embodiment in which the tool ram is in engagement only on the guide rail.

In a modified third embodiment shown in FIG. 9, a bottom opening 51 is formed in the frame base 20. The bottom opening 51 is expediently located below that point of the guide rail base 23, at which, in the embodiments of FIGS. 7 and 8, the opening 29 is positioned in the guide rail base 23. The guide rail base 23 contains, instead of the opening 29, a projection 52, which protrudes downward against the frame base 20 and is provided for engagement in the bottom opening 51. During the mounting, the mounting ram 43 lies against the top side 41 of the guide rail base 23 in the region opposite the projection 52 and presses the guide rail base 23 against the frame base 20 into an installation position in which an end face 53 of the projection 52 is positioned on the reference point 40. The reference point 40 is located in association with the bottom opening 51 preferably in a surface 54, which at least partially covers the bottom opening 51 on the underside. Preferably, a mounting support part 55 on its top side contains the surface 54. The mounting support part 55 forms a fixed mounting support on which the frame 10 rests, while the mounting ram 43 presses the guide rail base 23 against the frame base 20.

The projection 52 is in the form, for example, of a shaping of the guide rail base 23. On the other hand, the projection 52 may also be attached as a spacer to the underside of the in particular flat guide rail base 23. Preferably, even in this embodiment, the projection 52 does not have direct contact with or does not touch the frame base 20.

In a fourth embodiment (see FIG. 10) modifying the embodiment shown in FIG. 9, the guide rail base 23 is formed above the bottom opening 51 in the frame base without an opening or shaping and in particular with a flat surface. The bottom opening 51 is expediently located below that point of the guide rail base 23, at which, in the embodiments of FIGS. 7 and 8, the opening 29 is formed in the guide rail base 23. The mounting support part 55 has an elevation 56 which forms a spacer and extends through the bottom opening 51 when the frame base 20 rests on the mounting support part 55. An upper end face 57 of the elevation 56 contains the reference point 40.

Figure 10:
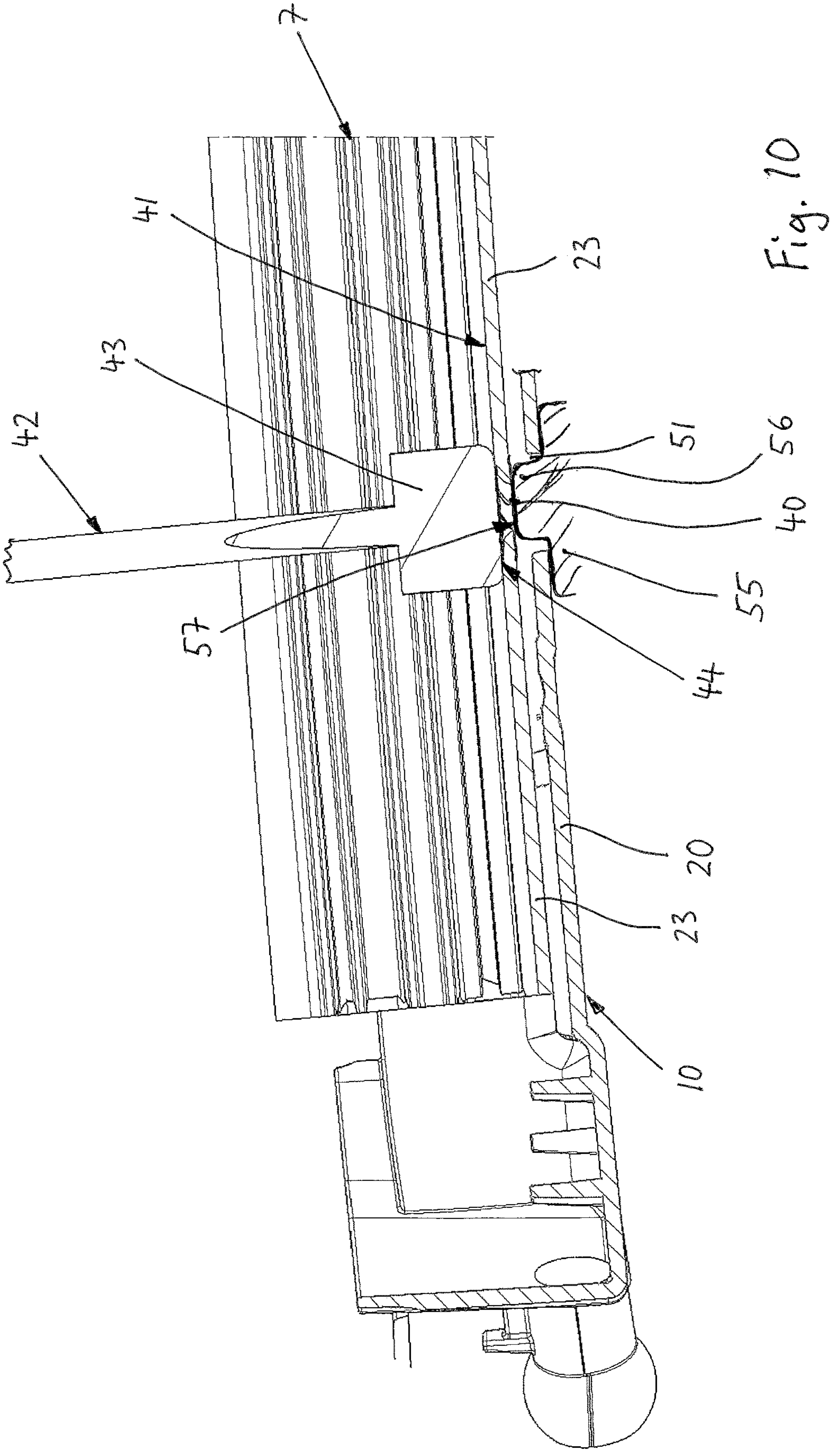
FIG. 10 shows, in a vertical longitudinal sectional view, another embodiment in which the tool ram is in engagement only on the guide rail.

Furthermore, the embodiments shown in FIGS. 9 and 10 can be modified in such a way that the guide rail base 23 has a projection 52 which is reduced in its height and the mounting support part 55 has an elevation 56 with a likewise reduced height. In combination, the projection 52 and the mounting support part 55 thus provide a spacer with the height required for positioning the guide rail 7.

The invention claimed is:

1. A vehicle roof having a frame device of a roof module and having a guide rail attached to the frame device for the movable mounting of a vehicle component, wherein the guide rail is arranged on a frame part of the frame device with a seal positioned in between, and wherein a reference point is provided for positioning the guide rail with a defined installation distance between the guide rail and the frame part and for positioning the guide rail free of contact with the frame part, and wherein the reference point is formed on the frame part, defined on the frame part or assigned to the frame part.

2. A vehicle roof having a frame device of a roof module and having a guide rail attached to the frame device for the movable mounting of a vehicle component, wherein the guide rail is arranged on a frame part of the frame device with a seal positioned in between, and in that a reference point is provided for positioning the guide rail with a defined installation distance between the guide rail and the frame part, wherein the reference point is formed on the frame part, defined on the frame part or assigned to the frame part, wherein the guide rail has a guide rail base with an opening arranged therein, in that on the frame part is arranged a spacer which protrudes from the frame part into the opening in the guide rail base and without contact with the guide rail base, and in that the spacer contains the reference point.

3. The vehicle roof as claimed in claim 2, wherein the spacer has a spacer head containing the reference point, and in that the spacer head is arranged level with a top side of the guide rail base surrounding the opening.

4. The vehicle roof as claimed in claim 1, wherein the guide rail has a guide rail base with an opening arranged therein, and in that on the frame part a frame part region arranged under the opening in the guide rail base defines or contains the reference point.

5. A vehicle roof having a frame device of a roof module and having a guide rail attached to the frame device for the movable mounting of a vehicle component, wherein the guide rail is arranged on a frame part of the frame device with a seal positioned in between, and in that a reference point is provided for positioning the guide rail with a defined installation distance between the guide rail and the frame part, wherein the reference point is formed on the frame part, defined on the frame part or assigned to the frame part, wherein the frame part has a bottom opening, in that the guide rail has a guide rail base on which a projection or a spacer is arranged or formed, which protrudes downward against or into the bottom opening in the frame part, without contact with the frame part, and in that the reference point is assigned to the bottom opening in the frame part.

6. The vehicle roof as claimed in claim 1, wherein the frame part has a bottom opening, in that the reference point is assigned to the bottom opening in the frame part, and in that the guide rail has a guide rail base via which it is arranged at a defined installation distance from the frame part.

7. The vehicle roof as claimed in claim 1, wherein the seal crosses under the guide rail laterally next to and spaced from the reference point or next to an opening or a bottom opening and adjacent thereto.

8. A method for mounting a guide rail on a frame device of a roof module of a vehicle roof, wherein the guide rail is provided for the movable mounting of a vehicle component, and the vehicle roof as claimed in claim 1 is formed, comprising: applying the seal to the frame part, positioning the guide rail above the frame part and with its opening above the reference point or the spacer, a mounting tool contacting the top side of the guide rail in the region of the opening, the mounting tool moving the guide rail against the frame part in an infeed movement, compressing the seal, and ending the infeed movement of the mounting tool is ended when the mounting tool has reached a defined position relative to the reference point or to the spacer, in which the guide rail has taken up its intended installation position.

9. A method for mounting a guide rail on a frame device of a roof module of a vehicle roof, wherein the guide rail is provided for the movable mounting of a vehicle component, and the vehicle roof as claimed in claim 1 is formed, applying the seal to the frame part, positioning the guide rail above the frame part and with its opening above the reference point, a mounting tool the top side of the guide rail in the region of the opening, the mounting tool moving the guide rail against the frame part in an infeed movement, compressing the seal, and ending the infeed movement of the mounting tool when the mounting tool, by means of a projection or tool spacer that engages in the opening or passes through the opening, has reached a defined position relative to the reference point on the frame part or in contact with the reference point, in which the guide rail has taken up its intended installation position.

10. A method for mounting a guide rail on a frame device of a roof module of a vehicle roof, wherein the guide rail is provided for the movable mounting of a vehicle component, and the vehicle roof as claimed in claim 1 is formed, applying the seal to the frame part, positioning the guide rail above the frame part and with its projection above a bottom opening in the frame part, a mounting tool contacting the top side of the guide rail in the region opposite its projection, the mounting tool moving the guide rail against the frame part in an infeed movement, compressing the seal, and ending the infeed movement of the mounting tool when the mounting tool has shifted the guide rail, by its projection passing through the bottom opening; into a defined position relative to the reference point, in which the guide rail has taken up its intended installation position.

11. A method for mounting a guide rail on a frame device of a roof module of a vehicle roof, wherein the guide rail is provided for the movable mounting of a vehicle component, and the vehicle roof as claimed in claim 1 is formed, applying the seal to the frame part, positioning the guide rail above the frame part and above a bottom opening in the frame part, a mounting tool contacting the top side of the guide rail in the region above the bottom opening in the frame part, the mounting tool moving the guide rail against the frame part in an infeed movement, compressing the seal, and lies against a mounting support part containing the reference point, which supports the frame part on the underside and passes through the bottom opening in the frame part.

12. The vehicle roof as claimed in claim 1, wherein the reference point is suitable and adapted for positioning the guide rail by a mounting tool.

13. The vehicle roof as claimed in claim 1, wherein the guide rail has an opening arranged therein, in that on the frame part is arranged a spacer which protrudes from the frame part into the opening in the guide rail and without contact with the guide rail, and in that the spacer contains the reference point.

* * * * *